(12) United States Patent
Matsuda

(10) Patent No.: US 8,060,301 B2
(45) Date of Patent: Nov. 15, 2011

(54) VEHICLE NAVIGATION APPARATUS

(75) Inventor: Akira Matsuda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 127 days.

(21) Appl. No.: 12/060,519

(22) Filed: Apr. 1, 2008

(65) Prior Publication Data

US 2008/0249711 A1   Oct. 9, 2008

(30) Foreign Application Priority Data

Apr. 9, 2007   (JP) ................................. 2007-101934

(51) Int. Cl.
*G01C 21/34* (2006.01)

(52) U.S. Cl. ........ 701/209; 704/231; 704/246; 704/251; 379/88.01

(58) Field of Classification Search .................. 701/209, 701/211; 704/200, 231, 246, 251; 379/88.01; G01C 21/34

See application file for complete search history.

(56) References Cited

U.S. PATENT DOCUMENTS

| | | | | |
|---|---|---|---|---|
| 5,761,638 | A * | 6/1998 | Knittle et al. .................. | 704/233 |
| 6,847,889 | B2 * | 1/2005 | Park et al. ...................... | 701/209 |
| 7,136,458 | B1 * | 11/2006 | Zellner et al. ............... | 379/88.02 |
| 7,398,209 | B2 * | 7/2008 | Kennewick et al. .......... | 704/255 |
| 7,809,563 | B2 * | 10/2010 | Lee ................................ | 704/251 |
| 7,826,945 | B2 * | 11/2010 | Zhang et al. ..................... | 701/36 |
| 7,865,303 | B2 * | 1/2011 | Weiss et al. .................... | 701/209 |
| 2001/0016500 | A1 * | 8/2001 | Son et al. ....................... | 455/456 |
| 2001/0053956 | A1 * | 12/2001 | Ohishi et al. .................. | 701/209 |
| 2002/0010579 | A1 * | 1/2002 | Kitaoka et al. ................ | 704/231 |
| 2002/0035475 | A1 * | 3/2002 | Yoda .............................. | 704/270 |
| 2002/0069071 | A1 * | 6/2002 | Knockeart et al. ............ | 704/275 |
| 2002/0128774 | A1 * | 9/2002 | Takezaki et al. ............... | 701/211 |
| 2004/0110515 | A1 * | 6/2004 | Blumberg et al. .......... | 455/456.1 |
| 2005/0171685 | A1 * | 8/2005 | Leung et al. ................... | 701/200 |
| 2005/0182563 | A1 * | 8/2005 | Adamski et al. .............. | 701/211 |

(Continued)

FOREIGN PATENT DOCUMENTS

JP          10-253377          9/1998

(Continued)

OTHER PUBLICATIONS

Heungkyn Lee, Obil Kwon, Hanseok Ko, "Speech interactive agent system for car navigation using embedded ASR/TTS and DSR", Publication Year: 2004 , pp. 620-625.*

(Continued)

*Primary Examiner* — Tuan C To

(74) *Attorney, Agent, or Firm* — Oblon, Spivak, McClelland, Maier & Neustadt, L.L.P.

(57) ABSTRACT

A disclosed vehicle navigation apparatus enables the issuance of an accurate and quick guidance. Voice uttered by an occupant of a vehicle is collected by a voice collecting unit and transmitted to an external facility by a voice transmitting unit. The external facility generates destination information based on the received voice, and transmits the destination information back to a destination information receiving unit of the apparatus. Based on the received destination information, the apparatus issues a guidance. The apparatus further includes a destination extracting unit by which the voice collected by the voice collecting unit is subjected to voice recognition in order to extract a destination from the collected voice. A tentative guidance is then issued based on the extracted destination until the destination information is received by the destination information receiving unit from the external facility.

12 Claims, 2 Drawing Sheets

U.S. PATENT DOCUMENTS

| | | | |
|---|---|---|---|
| 2005/0203744 A1* | 9/2005 | Tamura | 704/265 |
| 2006/0058947 A1* | 3/2006 | Schalk | 701/207 |
| 2007/0055444 A1* | 3/2007 | Mikame | 701/211 |
| 2007/0136070 A1* | 6/2007 | Lee | 704/270 |
| 2007/0185644 A1* | 8/2007 | Hirose | 701/200 |
| 2007/0244629 A1* | 10/2007 | Hirayama | 701/200 |
| 2009/0112582 A1* | 4/2009 | Kuwagaki et al. | 704/225 |

FOREIGN PATENT DOCUMENTS

| | | |
|---|---|---|
| JP | 2001-147132 | 5/2001 |
| JP | 2002-213969 | 7/2002 |
| JP | 2003-240577 | 8/2003 |
| JP | 2006-510004 | 3/2006 |
| JP | 2006338261 A * | 12/2006 |

OTHER PUBLICATIONS

Sukkar, R.A., Chin-Hui Lee, "Vocabulary independent discriminative utterance verification for nonkeyword rejection in subword based speech recognition", Publication Year: 1996, pp. 420-429, vol. 4, Issue: 6.*

* cited by examiner

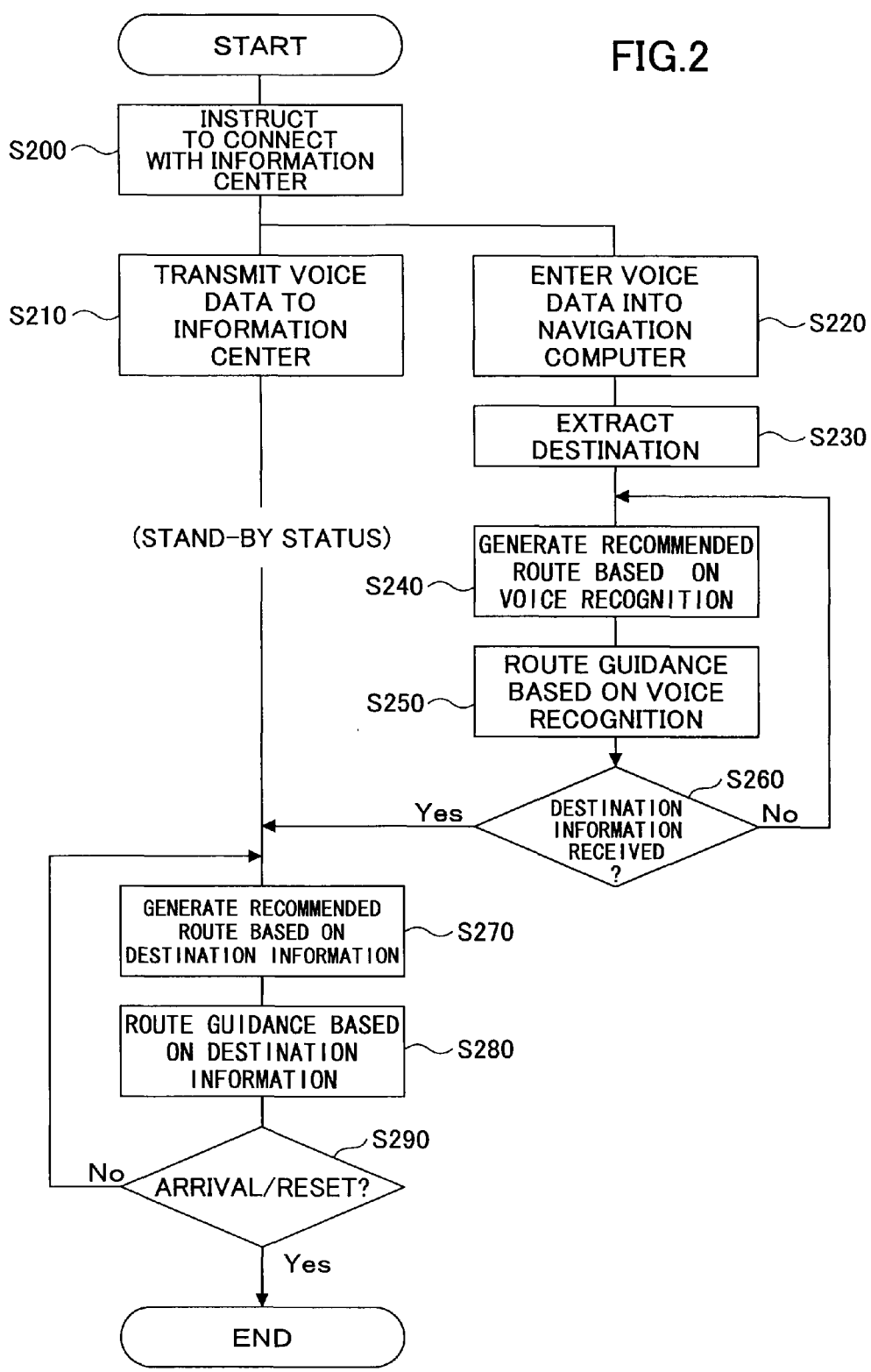

VEHICLE NAVIGATION APPARATUS

BACKGROUND OF THE INVENTION

1. Field of the Invention

The present invention relates to a vehicle navigation apparatus that receives destination information generated outside a vehicle via wireless communications and provides guidance instructions based on the received information.

2. Description of the Related Art

A navigation system for automobiles is known whereby an occupant of a vehicle communicates with an operator at a remote communication center, notifying the operator with a destination so that the operator can search a database for information about the destination and transmit the destination information back to the vehicle. In the vehicle, guidance instructions are provided based on the received destination information (see Japanese Laid-Open Patent Application No. 10-253377, for example).

This system is advantageous compared with another system that provides guidance based solely on map information stored in a vehicle-mounted recording medium because the map information stored outside the vehicle enables the installation of a large-scale database, which in turn makes it possible to provide more precise guidance instructions. In other words, while the vehicle-mounted recording medium is subject to a number of size and cost limitations, a recording medium installed in an external facility suffers from less such limitations. Furthermore, by connecting the external facility to a content provider, for example, it also becomes possible to update the maps, names of locations and buildings, or other information such as coordinates in the external database quickly. As a result, guidance that is based on the most up-to-date information can be provided.

However, because the communication between the vehicle and the external facility requires some time (including the time for the occupant, such as a driver, to convey a destination and the time for the vehicle to receive destination information in the form of an electric signal), a problem arises that the start of guidance is delayed compared with the guidance based solely on the map information stored in a vehicle-mounted recording medium. This problem may actually lead to a situation where the vehicle has moved in a direction opposite to the destination by the time the guidance is provided.

SUMMARY OF THE INVENTION

It is therefore a general object of the present invention to overcome the aforementioned problem. A more specific object is to provide a vehicle navigation apparatus capable of providing an accurate and quick guidance.

In one embodiment, the invention provides a vehicle navigation apparatus comprising a voice collecting unit configured to collect voice uttered by an occupant of a vehicle; a voice transmitting unit configured to transmit the voice collected by the voice collecting unit to a facility outside the vehicle; and a destination information receiving unit configured to receive destination information from the external facility. The destination information is created at the external facility based on the voice transmitted by the voice transmitting unit. The apparatus issues a guidance based on the destination information received by the destination information receiving unit. The apparatus further comprises a destination extracting unit configured to extract a destination from the voice collected by the voice collecting unit by subjecting the voice to voice recognition. A guidance based on the destination extracted by the destination extracting unit is provided until the destination information is received by the destination information receiving unit from the external facility.

In a preferred embodiment, the guidance based on the destination extracted by the destination extracting unit may be provided until the guidance based on the destination information received by the destination information receiving unit is initiated, or until a recommended route based on the destination information received by the destination information receiving unit is generated.

In accordance with these embodiments, an accurate and the most up-to-date route guidance can be provided because the guidance is based on the destination information generated at the external facility, where there are not so many constraints regarding the size or cost of a recording medium in which map information is stored as in the vehicle-mounted recording medium, allowing the storage of large volumes of data and making it possible to update the stored information quickly. While the communication between the vehicle and the external facility requires some time, resulting in the blank period before the start of guidance, voice uttered by the user is analyzed by voice recognition technology to extract information indicating a destination, and a tentative route guidance is provided based on the extracted destination. Thus, problems associated with delayed guidance can be overcome.

In a preferred embodiment, the destination extracting unit is configured to convert the voice collected by the voice collecting unit into a text and configured to extract text information located before or after a specific keyword in the text as a specific destination.

Thus, an accurate and fast guidance can be provided.

BRIEF DESCRIPTION OF THE DRAWINGS

These and other objects, features and advantages of the invention will be apparent to those skilled in the art from the following detailed description of the invention, when read in conjunction with the accompanying drawings in which:

FIG. 2 shows a flowchart of typical steps performed by a navigation computer of the vehicle navigation apparatus of FIG. 1.

DETAILED DESCRIPTION OF THE PREFERRED EMBODIMENTS

Figure 1:
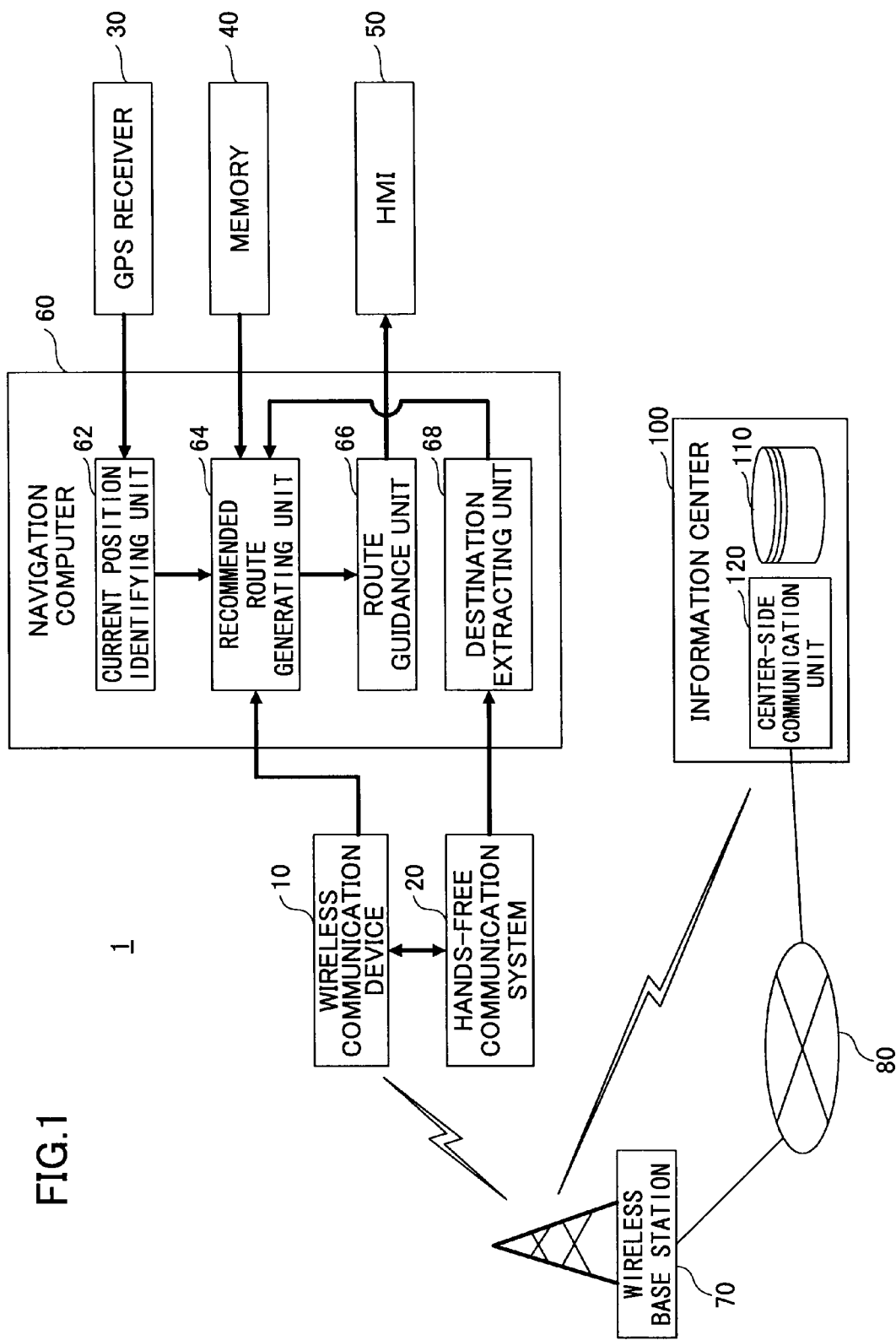
FIG. 1 shows an example of an overall configuration of a vehicle navigation apparatus according to an embodiment of the invention.

In the following, the present invention is described by way of embodiments with reference made to the attached drawings.

FIG. 1 shows an overall configuration of a vehicle navigation apparatus 1 according to an embodiment of the invention. The vehicle navigation apparatus 1 comprises a wireless communications device 10; a hands-free communication system 20; a GPS receiver 30; a memory 40; a human-machine interface (HMI) 50; and a navigation computer 60. The arrows in the drawings indicate the main flows of information communication within a vehicle on which the apparatus is mounted. The communication may be carried out via multiplex communication lines and in accordance with an appropriate communication protocol, such as Controller Area Network (CAN), Body Electronics Area Network (BEAN), Audio Visual Communication-Local Area Network (AVC-LAN), or FlexRay.

The wireless communications device 10 is configured to transmit and receive information to and from an information center 100 via a wireless base station 70 and a network 80.

Between the wireless communications device 10 and the wireless base station 70, wireless communications may be performed using various technologies, such as a cellular phone network, a Personal Handy-phone System (PHS) network, a wireless local area network (LAN), Worldwide Interoperability for Microwave Access (WiMAX), satellite telephone technologies, and a beacon. The network 80 by which the wireless base station 70 and the information center 100 are connected is a wired network, such as a public switched telephone network (PSTN), a digital communication network (such as the Integrated Services Digital Network, or "ISDN"), or an optical fiber (However, the communications between the wireless base station 70 and the information center 100 may be based on a wireless technology). The wireless communications device 10 may be equipped with mechanisms that are equivalent to those of a cellular phone. Alternatively, a commercially available cellular phone may be communicatively connected with the vehicle via a mechanical connection, a wired connection, or a short-distance wireless transmission system such as a Bluetooth system, to provide the function of the wireless communication device 10. The cellular phone is merely an example of the communication device and other devices may be used. In accordance with the present embodiment, the wireless communications device 10 is controlled by the navigation computer 60.

The information center 100 herein refers to a facility that provides various information services to the vehicle of a user (which may or may not be the driver) based upon a contract. The information center 100 includes a database 110 and a center-side communication unit 120. The information center 100 may be operated by an automobile manufacturer and staffed with operators who perform various operations on the database 110 or the center-side communication unit 120, as well as interacting with users over the phone.

The hands-free communication system 20 may include a voice recognition microphone, a speaker, a telephone switch, and cellular phone cables mounted on the ceiling of the passenger compartment. By connecting a cellular phone to the system, a driver, for example, can communicate with the outside of the vehicle without holding the cellular phone in his hand. Alternatively, instead of connecting the cellular phone via cables, part of the mechanisms of the wireless communications device 10 may be shared for external communication purposes. Any other mechanism may be employed as long as it allows communication between the vehicle and an operator in the information center 100. In accordance with the present embodiment, the hands-free communication system 20 is controlled by the navigation computer 60 and uses the HMI 50 for user interface.

The GPS receiver 30 receives electromagnetic wave signals from a GPS satellite conveying data concerning time and the orbit of the satellite, and outputs such data to the navigation computer 60.

The memory 40 may be a recording medium such as a hard disc drive (HDD), a digital video (or versatile) disk (DVD), or a Compact Disc read-only memory (CD-ROM) in which map information is stored. The map information may specify road configurations in terms of nodes indicating intersections or the like and links connecting the individual nodes. The map information may include names of major buildings and places that can be a destination, and coordinates (latitudes and longitudes) of various facilities.

The HMI 50 consists of a group of devices for providing an input/output interface between a user and the vehicle navigation apparatus. The devices may include a touch-panel display unit configured to enable a user to enter various data as well as presenting an image display; a microphone for voice input and output; a speaker; and a buzzer. The output content of the HMI 50 is determined by the navigation computer 60, to which input operations made via the HMI 50 are provided.

The navigation computer 60 may be a computer unit including a CPU to which a read-only memory (ROM) and a random access memory (RAM) are connected via buses. The navigation computer 60 may further include a recording medium such as a HDD or a DVD, an I/O port, a timer, and a counter. In the ROM, programs or data executed by the CPU may be stored. The navigation computer 60 includes a current position identifying unit 62, a recommended route generating unit 64, a route guidance unit 66, and a destination extracting unit 68 as major functional blocks, which may be activated upon loading of the programs stored in the ROM by the CPU on the RAM where they are executed.

The current position identifying unit 62 identifies the current position (latitude, longitude, and altitude) of the vehicle on which it is mounted by performing calculations based on time difference of electromagnetic wave signals received by the GPS receiver 30. The current position of the vehicle may be corrected based on various information, such as the outputs of various sensors including a vehicle speed sensor and a gyro sensor, and various other information received via a beacon receiver and an FM multiplex broadcast receiver, for example.

The recommended route generating unit 64 may generate a recommended route to a destination by the Dijkstra method. The route guidance unit 66 presents a navigation display or provide voice guidance via the HMI 50 in order to guide the vehicle along the recommended route.

The function of the destination extracting unit 68 is described later.

Sending a Destination Search Request to Information Center 100

In accordance with the present embodiment, a destination may be set by a user performing a touch operation via the HMI 50, or by the user asking an operator at the information center 100 to conduct a destination search, using the hands-free communication system 20.

Thus, more accurate and more up-to-date route guidance can be provided based on accurate and the latest information available at the information center 100 than when a guidance is based solely on the map information stored in the memory 40. This is due to the fact that, while the vehicle-mounted memory 40 is subject to many limitations in size and cost, the database 110 installed at the information center 100 is subject to less such limitations and can be larger in size or volume. Furthermore, by connecting the information center 100 with a content provider, for example, information about the road configurations, place names or building names as destination candidates, and their coordinates can be quickly updated, whereby guidance based on the latest information can be provided. Furthermore, because a destination is designated through communication, even a user not used to mechanical operations can operate the apparatus with confidence.

In the following, a basic procedure for sending a request to the information center 100 to conduct a destination search is described. As a user performs a predetermined operation or enters a voice input via the HMI 50 for connection with the center, the navigation computer 60 instructs the wireless communications device 10 or the hands-free communication system 20 to call a pre-registered destination search request number or the like of the information center 100.

Upon establishing a connection with the information center 100, the user designates a desired destination to the operator in the information center 100, and asks him to perform a search and transmit relevant destination information back to the vehicle.

The operator in the information center 100 searches the database 110 for the destination designated by the user, and sends back a search result (destination information, including coordinates) to the vehicle in the form of an electric signal.

After the destination information is received on the vehicle, the recommended route generating unit 64 generates a recommended route from the current position identified by the current position identifying unit 62 to the coordinates of the destination received from the information center 100. The route guidance unit 66 then presents a navigation display or issues a voice guidance via the HMI 50 in order to guide the vehicle along the recommended route.

Problem

However, there is the aforementioned problem that, in the case of requesting the information center 100 to conduct a destination search, it takes longer before the start of actual route guidance due to the time required for the communications conducted between the vehicle and the information center 100 and other procedures. As a result, it is possible that the vehicle has traveled in a direction opposite to a desired destination when the guidance is issued.

The problem is overcome by the present invention providing a tentative route guidance at the vehicle end in the blank time between the procedure to request a destination search by the information center 100 and the start of actual route guidance (or the reception of destination information from the information center 100).

It is, however, troublesome if the user has to perform a touch operation or the like via the HMI 50 to set a destination solely for such a tentative route guidance during the blank time.

Tentative Route Guidance by Voice Recognition

Thus, in the vehicle navigation apparatus 1 of the present embodiment, after the user has performed a predetermined operation or voice input for center connection, the content of speech (voice data) made with the hands-free communication system 20 or the like is fed to the navigation computer 60. The entered speech content (voice data) is subjected to voice recognition by the destination extracting unit 68, whereby a destination contained in the entered speech content is extracted. Based on the extracted destination, the recommended route generating unit 64 generates a temporarily recommended route based on which a tentative route guidance is provided.

Various voice recognition technologies are known for converting voice data into a text, so that the description of the details of such a process is herein omitted.

From the text-converted voice data, a destination may be extracted by the following method:

A number of specific keyword phrases typically associated with a request concerning a destination are prepared. Examples of such keyword phrases are: "I wish to go to *," "To *," "The destination is *," "I'm going to *," and "*** is my destination." Then, the words in the portion (with asterisks) following (or preceding, in the case of the last example) the keyword phrases are extracted as a destination.

Alternatively, the user may be required to perform some switching or touch operation at the beginning and end of a destination. In this way, the destination portion of voice data can be more accurately identified.

Control Flow

FIG. 2 shows a flowchart of a typical process performed by the navigation computer 60, which is initiated upon entry by a user of a predetermined operation or voice input for connection with the center.

The navigation computer 60 instructs the wireless communications device 10 or the hands-free communication system 20 to establish a connection with the information center 100 (S200).

Upon establishing a connection with the information center 100, the user starts communicating with an operator at the information center 100. The voice data (user's voice) entered on the hands-free communication system 20 is transmitted to the information center 100 on a real-time basis (S210) and is also fed to the navigation computer 60 (S220).

Following the entry of the voice data, the destination extracting unit 68 extracts a destination from the voice data as described above (S230). Before destination information is received from the information center 100, a tentative route to the destination extracted by the destination extracting unit 68 is generated and a tentative route guidance is issued based on the tentative route (S240, S250, and S260). During this interval, the wireless communications device 10 is in a standby mode, waiting for destination information from the information center 100.

After a search process is performed in the information center 100 as described above and destination information is received from the information center 100, a recommended route to the destination is generated based on the information received from the information center 100, and a route guidance is issued. The guidance, which is based on the external information, continues until either the destination is reached or a procedure to set another destination (including the process of connecting with the center and the initial operation to set a destination via the HMI 50) is started (S270, S280, S290).

In accordance with the vehicle navigation apparatus 1 of the present embodiment, the problem of the extended blank time before the start of route guidance due to the time required for communications can be thus overcome, while the procedure of asking the information center 100 to conduct a destination search is still taken advantage of.

Namely, by requesting the information center 100 to conduct a destination search, route guidance based on accurate and the latest information can be obtained. Because such a request is made through a verbal communication, a user not used to mechanical operations can make such a request with ease. During the blank time before route guidance starts, a destination contained in the speech content is extracted by voice recognition, and a tentative route guidance is provided based on the extracted destination. Thus, the problem of the vehicle traveling in an opposite direction to the destination during the blank time can be prevented.

Thus, in accordance with the invention, an accurate and quick guidance can be issued.

In another embodiment, the tentative route guidance based on voice recognition may be performed not until destination information is received from the information center 100 but until a recommended route is generated on the vehicle based on the destination information. In another embodiment, the tentative route guidance may be performed until route guidance based on destination information is actually started.

Destination information is not limited to the coordinates of a designated destination. For example, a recommended route may be generated at the information center 100 based on the current position of the vehicle to a destination, and the recommended route thus generated outside the vehicle may be transmitted back to the vehicle. In this case, when initially establishing a connection between the vehicle and the information center 100, and continually as the vehicle travels, a current position identified by the current position identifying unit 62 is transmitted to the information center 100.

In yet another embodiment, the search process within the information center 100 may involve a computer, rather than a human operator, performing voice recognition to extract a destination.

The present invention may be utilized by automobile manufacturing industries or automotive component manufacturing industries.

While the present invention has been described with reference to specific embodiments, the invention is not limited by such embodiments, and various changes or modifications may occur to those skilled in the art without departing from the scope of the invention.

The present application is based on the Japanese Priority Application No. 2007-101934 filed Apr. 9, 2007, the entire contents of which are hereby incorporated by reference.

What is claimed is:

1. A vehicle navigation apparatus comprising:
a voice collecting unit configured to collect voice uttered by an occupant of a vehicle;
a voice transmitting unit configured to transmit the voice collected by the voice collecting unit to a facility outside the vehicle;
a destination information receiving unit configured to receive destination information from the external facility, the destination information being generated at the external facility based on the voice transmitted by the voice transmitting unit; and
a destination extracting unit configured to extract a destination from the voice collected by the voice collecting unit by subjecting the voice collected by the voice collecting unit to voice recognition;
wherein the vehicle navigation apparatus issues a first guidance based on the destination extracted by the destination extracting unit following the collection of the voice by the voice collecting unit, until the destination information is received by the destination information receiving unit,
wherein the vehicle navigation apparatus issues a second guidance based on the destination information received by the destination information receiving unit,
wherein the first guidance and the second guidance are based on the same voice uttered by the occupant of the vehicle,
wherein the first guidance is visual or audible instructions issued by the navigation apparatus to the occupant to instruct the occupant how to guide the vehicle from a current position of the vehicle to the destination extracted by the destination extracting unit, along a first route, and
wherein the second guidance is visual or audible instructions issued by the navigation apparatus to the occupant to instruct the occupant how to guide the vehicle from the current position of the vehicle to the destination based on the destination information received by the destination information receiving unit along a second route.

2. The vehicle navigation apparatus according to claim 1, wherein the destination extracting unit is configured to convert the voice collected by the voice collecting unit into a text, and configured to extract text information located before or after a specific keyword in the text as the destination.

3. The vehicle navigation apparatus according to claim 1, further comprising:
a current position identifying unit that identifies the current position of the vehicle.

4. The vehicle navigation apparatus according to claim 1, wherein the vehicle navigation apparatus issues the first guidance until the second guidance is issued.

5. A method for controlling a vehicle navigation apparatus including a voice collecting unit configured to collect voice of an occupant of a vehicle, the method comprising:
transmitting the voice collected by the voice collecting unit to a facility outside the vehicle;
extracting a destination from the voice collected by the voice collecting unit by subjecting the voice collected by the voice collecting unit to voice recognition;
receiving destination information from the facility;
issuing a first guidance based on the destination extracted from the voice following the collection of the voice by the voice collecting unit, until the destination information is received; and
issuing a second guidance based on the destination information received,
wherein the first guidance and the second guidance are based on the same voice uttered by the occupant of the vehicle,
wherein the first guidance is visual or audible instructions issued by the navigation apparatus to the occupant to instruct the occupant how to guide the vehicle from a current position of the vehicle to the destination extracted from the voice along a first route, and
wherein the second guidance is visual or audible instructions issued by the navigation apparatus to the occupant to instruct the occupant how to guide the vehicle from the current position of the vehicle to the destination based on the destination information received along a second route.

6. The method for controlling a vehicle navigation apparatus according to claim 5, wherein the extracting the destination includes
converting the voice collected by the voice collecting unit into a text, and
extracting text information located before or after a specific keyword in the text as the destination.

7. The method for controlling the vehicle navigation apparatus according to claim 5, further comprising:
identifying the current position of the vehicle.

8. The method for controlling the vehicle navigation apparatus according to claim 5, wherein the vehicle navigation apparatus issues the first guidance until the second guidance is issued.

9. A vehicle navigation system comprising:
an external facility; and
a vehicle navigation apparatus including
a voice collecting unit configured to collect voice uttered by an occupant of the vehicle,
a voice transmitting unit configured to transmit the voice collected by the voice collecting unit to the external facility,
a destination information receiving unit configured to receive destination information from the external facility, and
a destination extracting unit configured to extract a destination from the voice collected by the voice collecting unit by subjecting the voice collected by the voice collecting unit to voice recognition,
wherein the external facility is configured to generate the destination information based on the voice transmitted by the voice transmitting unit and configured to transmit the destination information to the vehicle navigation apparatus, wherein the vehicle navigation apparatus issues a first guidance based on the destination extracted by the destination extracting unit following the collection of the voice by the voice collecting unit, until the destination information is received by the receiving unit, wherein the vehicle navigation apparatus issues a second guidance based on the destination information received by the destination receiving unit, wherein the first guidance and the second guidance are based on the same voice uttered by the occupant of the vehicle, wherein the first guidance is visual or audible instructions issued by the navigation apparatus to the occupant to instruct the occupant how to guide the vehicle from a current position of the vehicle to the destination extracted by the destination extracting unit along a first route, and wherein the second guidance is visual or audible instructions issued by the navigation apparatus to the occupant to instruct the occupant how to guide the vehicle from the current position of the vehicle to the destination based on the destination information received by the destination information receiving unit along a second route.

10. The vehicle navigation system according to claim 9, wherein the destination extracting unit is configured to convert the voice collected by the voice collecting unit into a text, and configured to extract text information located before or after a specific keyword in the text as the destination.

11. The vehicle navigation system according to claim 9, further comprising:

a current position identifying unit that identifies a current position of the vehicle.

12. The vehicle navigation system according to claim 9, wherein the vehicle navigation system issues the first guidance until the second guidance is issued.

\* \* \* \* \*